US006963154B2

(12) United States Patent
Matsunobu et al.

(10) Patent No.: US 6,963,154 B2
(45) Date of Patent: Nov. 8, 2005

(54) PERMANENT MAGNET TYPE ELECTRIC ROTATING MACHINE AND HYBRID ELECTRIC VEHICLE USING IT

(75) Inventors: Yutaka Matsunobu, Hitachinaka (JP); Fumio Tajima, Juoumachi (JP); Shouichi Kawamata, Hitachi (JP); Osamu Koizumi, Ibaraki (JP); Sanshiro Obara, Tokai (JP)

(73) Assignee: Hitachi, Ltd., Tokyo (JP)

( * ) Notice: Subject to any disclaimer, the term of this patent is extended or adjusted under 35 U.S.C. 154(b) by 330 days.

(21) Appl. No.: 10/166,768

(22) Filed: Jun. 12, 2002

(65) Prior Publication Data

US 2002/0153795 A1 Oct. 24, 2002

Related U.S. Application Data

(63) Continuation of application No. 09/653,805, filed on Sep. 1, 2000, now Pat. No. 6,429,565.

(30) Foreign Application Priority Data

Mar. 3, 2000 (JP) ........................................ 2000-063277

(51) Int. Cl.$^7$ ........................ H02K 21/12; H02K 21/14
(52) U.S. Cl. ............................. 310/156.38; 310/156.53; 310/261; 180/65.1
(58) Field of Search .................... 310/261, 156.01, 310/156.53, 156.12, 156.48, 156.38, 156.56, 254; 180/65.1

(56) References Cited

U.S. PATENT DOCUMENTS 5,811,904 A * 9/1998 Tajima et al. .......... 310/156.45
5,886,440 A * 3/1999 Hasebe et al. ......... 310/156.19
5,910,691 A * 6/1999 Wavre ........................ 310/12
5,936,322 A * 8/1999 Yamaguchi et al. ... 310/156.19
5,990,591 A * 11/1999 Yamaguchi et al. ........ 310/156
6,034,459 A * 3/2000 Matsunobu et al. ... 310/156.38
6,133,662 A * 10/2000 Matsunobu et al. ... 310/156.53
6,208,054 B1 * 3/2001 Tajima et al. ................ 310/156
6,239,525 B1 * 5/2001 Matsunobu et al. ........ 310/156

FOREIGN PATENT DOCUMENTS

| JP | 7 255138 | 10/1995 | ............ H02K/1/27 |
| JP | 8-099538 | 4/1996 | ............ B60K/7/00 |
| JP | 11-299199 | 10/1999 | ............ H02K/21/14 |

\* cited by examiner

Primary Examiner—Burton Mullins
(74) Attorney, Agent, or Firm—Crowell & Moring LLP (57) ABSTRACT

A permanent magnet type electric rotating machine comprises a stator having a salient-pole concentrated winding, and a rotor disposed with a rotational gap, and having a plurality of permanent magnets arranged and fixed in a circumferential direction inside, and an auxiliary salient pole provided between the permanent magnets. A ratio of the number of poles for the rotor and the number of slots for the stator is 2:3 and, when a slot pitch of the stator is τs (electrical angle), an angle θ (electrical angle) made by a circumferential width of the permanent magnet in the surface of the stator side with an axis of the rotor is set at $\theta \approx n \times \tau s/2 + 8 \times m$ (n=1 or 2, and m=1, 2 or 3). Thus, pulsation torque, cogging torque or the waveform distortion of a no-load induced voltage is selectively reduced as occasion demands.

12 Claims, 9 Drawing Sheets

PERMANENT MAGNET TYPE ELECTRIC ROTATING MACHINE AND HYBRID ELECTRIC VEHICLE USING IT

This application is a continuation of U.S. patent application Ser. No. 09/653,805, filed Sep. 1, 2000, now U.S. Pat. No. 6,429,565.

BACKGROUND OF THE INVENTION

The present invention relates to a pole structure in a permanent magnet type electric rotating machine, which is composed of a stator having a salient-pole concentrated winding, and a rotor having a permanent magnet arranged and fixed in a circumferential direction, and which is suitably used particularly for a hybrid electric vehicle. The invention further relates to a hybrid electric vehicle using such a permanent magnet type electric rotating machine.

Generally, as regards an electric rotating machine for an electric vehicle, a so-called vehicle wheel motor for an electric vehicle has been used as a driving source for an industrial vehicle such as a load carrier. For example, one disclosed in JP-A-8-99538 has already been known. Such a vehicle wheel motor includes a permanent magnet type electric rotating machine having a salient-pole concentrated winding. According to this technology, to suppress the generation of noise at an extremely low speed, a ratio between the number of magnetic poles for a rotor and the number of slots for a stator is set equal to a predetermined value. The above conventional technology provides an exemplary structure where the number of magnetic poles for the rotor is 8, and the number of slots for the stator is 12. However, such a technology is designed to suppress the generation of noise by performing so-called skewing magnetization in a surface magnet type electric rotating machine having a magnet disposed on the surface of the rotor. Although the fixing of the magnet to the rotor surface is not specified, it can be understood from its structure that the magnet is fixed by adhesive or the like.

Figure 1:
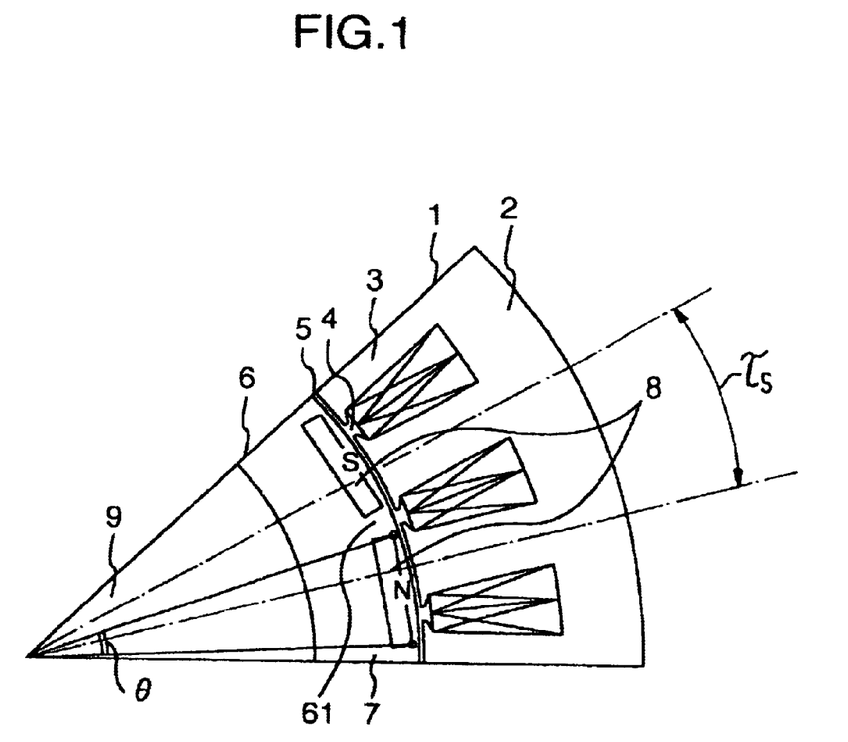
FIG. 1 is a sectional view illustrating in partial expansion a one pole pair structure of a permanent magnet type electric rotating machine according to a first embodiment of the present invention.

For example as disclosed in JP-A-11-299199, a permanent magnet type electric rotating machine presented by the present inventors and an electric vehicle using such an electric rotating machine have been known. This electric rotating machine is different from the machine of the invention comprising a stator having a salient-pole concentrated winding in that a so-called distributed winding having three-phase 8 poles/48 slots (1:6) is set for a stator iron core. An angle θ (mechanical angle) between the circumferential width of each permanent magnet in the outer peripheral surface of the stator side and the shaft center of the rotor is set at $\theta \approx n \times \tau_s + 16/P$ (is a natural number), where a slot pitch of the stator is $\tau_s$ (mechanical angle, as shown in FIG. 1), and the number of poles is P.

In addition, as regards an electric motor for other than vehicle, for example as disclosed in JP-A-7-255138, there is available a permanent magnet type electric synchronous rotating machine structured to have the number of rotor poles set at 6, and the number of stator slots set at 9. However, this technology uses a magnet shaped like a convex lens in section, and a triangular groove for preventing the leakage of magnetic fluxes is provided between the poles.

SUMMARY OF THE INVENTION

In recent years, from the standpoint of protecting the global environment, so-called hybrid electric vehicles equipped with gasoline engines and electric motors have been presented in a part of efforts to reduce toxic exhaust from automobiles, and expectation is now placed on the practical use thereof. However, in the hybrid electric vehicle expected to have a structure where a general gasoline engine and an electric motor are directly connected to one and the same drive shaft (i.e., mounted in a narrow place in a car body), the following problems can be pointed out for the electric motor of the conventional technology.

That is, first, in the surface magnet type electric rotating machine of the conventional technology disclosed in the above-described JP-A-8-99538, a noise reduction (reductions in cogging torque and torque pulsation) is achieved by skewing the permanent magnet in an axial direction. However, the problem of holding the magnet in the surface magnet type electric rotating machine still remains to be solved. Specifically, in the case of the electric rotating machine driven to the speed of revolution of about 3000 rpm as described in the conventional technology, the permanent magnet located in the outer periphery of the rotor can be fixed by adhesive or the like. In the case of the hybrid electric vehicle, however, the electric rotating machine and an engine are connected in series to the drive shaft. Thus, if the electric rotating machine is rotary-driven at the same speed of revolution as that for the engine (e.g., 6000 rpm), the holding of the magnet must be assured even during rotation at such a high speed. In this case, the magnet is bound by a non-magnetic material (e.g., stainless or reinforced plastic material). Consequently, a gap with the stator may be increased, and the size of the electric rotating machine itself may also be increased, leading to high manufacturing costs.

In addition, in the surface magnet type electric rotating machine having a magnet rotor like that of the conventional technology, in particular when a frequency becomes high during rotation at a high speed, an eddy-current loss may occur on the surface of the magnet.

Secondly, in the electric rotating machine designed to drive the vehicle, which is disclosed in the above-described JP-A-11-299199, as large output torque is required, a distributed winding having tree-phase 8 poles/48 slots (1:6) is set for its stator iron core. Consequently, the axial length of the electric rotating machine is longer. Therefore, this structure of the electric rotating machine is not suitable for the hybrid electric vehicle.

Thirdly, in the permanent magnet type electric synchronous rotating machine made widely known by the above-described JP-A-7-255138, a magnetic flux formed by the permanent magnet is caused to be a sine wave by the magnet shaped like a convex lens in section and the triangular groove provided between the poles to prevent the leakage of magnetic fluxes. Cogging torque is thereby reduced. However, the magnet shaped like a convex lens in section is costly. In addition, because of the triangular groove provided between the poles to prevent the leakage of magnetic fluxes, a mechanical strength of the rotor may be reduced. Therefore, this structure is not suitable for an electric rotating machine requiring a large output to be used for the hybrid electric vehicle.

The present invention was made to solve the problems described above in detail, which are inherent in the conventional technologies. An object of the invention is to provide a permanent magnet type electric rotating machine, and another object is to provide a hybrid electric vehicle using the same.

In order to achieve the foregoing object, in accordance with an aspect of the invention, there is provided a permanent magnet type electric rotating machine, comprising a stator having a salient-pole concentrated winding, and a rotor disposed by keeping a rotational gap with the stator, and having a plurality of permanent magnets arranged and fixed in a circumferential direction inside a rotor iron core and an auxiliary salient pole between the permanent magnets. In this case, a ratio between the number of poles for the rotor and the number of slots for the stator is 2:3 and, when a slot pitch of the stator is τs (electrical angle), an angle θ (electrical angle) made by a circumferential width of the permanent magnet in the surface of the stator side with an axis of the rotor is set at θ≈n×τs/2+8×m (n=1 or 2, and m=1, 2 or 3).

According to the permanent magnet type electric rotating machine of the invention constructed in the foregoing manner, an axial length is short from the stator structure of a salient-pole concentrated winding shape, and thus the electric rotating machine can be mounted relatively easily even in a very narrow space inside the car body of the hybrid electric vehicle. In addition, by setting the peripheral length of the permanent magnet in the surface of the stator side, without any skewing with a molding magnet, torque pulsation and cogging torque can be reduced, or an induced voltage can be a sine wave.

In accordance with another aspect of the invention, there is provided a hybrid electric vehicle, comprising the above-described permanent magnet type electric rotating machine, which is mounted in serial connection to a drive shaft of an engine.

In the hybrid electric vehicle comprising the permanent magnet type electric rotating machine of the invention mounted thereon, vibration is reduced at the time of starting or stopping the hybrid electric vehicle. Thus, more comfortable riding can be realized.

DETAILED DESCRIPTION OF THE EMBODIMENTS

Next, the preferred embodiments of the present invention will be described with reference to the accompanying drawings.

FIG. 1 illustrates partially in section a permanent magnet type electric rotating machine according to a first embodiment of the invention, particularly its pole pair structure. The permanent magnet type electric rotating machine of the embodiment is based on a so-called salient-pole concentrated winding system having, for example the number of poles for a rotor set at 16 and the number of slots for a stator set at 24 (2:3). Now, a feature configuration of the first embodiment will be described in detail by referring to FIG. 1 showing one pole pair.

First, in FIG. 1, a stator 1 of the electric rotating machine is constructed by winding a U-phase stator winding U1, a V-phase stator winding V1, and a W-phase stator winding W1 respectively on 24 teeth 3 formed to be protruded from a core back 2 having a nearly annular outer shape to an inner peripheral side. In the inner peripheral portion of the iron core of the stator 1, so-called opening portions 4 are formed corresponding to respective slots. When the U-phase, V-phase and W-phase windings are wound on the stator, the winding work is facilitated by dividing the core back 2 and the teeth 3. According to the invention, however, other than such a divisible structure of the core back 2 and the teeth 3, a so-called undivided structure allowing no division may be employed.

Different from such a stator structure, a rotor 6 of the electric rotating machine of the invention is constructed by fitting and fixing a rotor iron core 7 to rotary shaft 9. To be specific, near the outer peripheral portion of the rotor iron core 7, a plurality of holes are formed in its circumferential direction to constitute a housing portion square in section. Inside, for example, as shown in the drawing, permanent magnets 8 made of neodymium are magnetized with N and S poles alternately disposed, and inserted from an axial direction to be assembled. The rotor iron core 7 is constructed by laminating a number of silicon steel plates formed in disk shapes by punching together with plurality of holes forming the magnet housing portion. The rotor 6 is rotatably disposed inside the stator 1 by keeping a specified gap with respect to the tip portion of the teeth 3 extended from the core back 2 to the inner periphery. In addition, in the rotor 6, a so-called auxiliary salient pole 61 is formed between adjacent permanent magnets 8.

In the configuration of the permanent magnet type electric rotating machine of the invention having the above structure, and specifically based on the salient-pole concentrated winding system having the ratio between the number of poles for the rotor and the number of slots for the stator set at 2:3, special consideration was given to a phenomenon described below, which appears when the permanent magnet 8 is changed in its circumferential section.

Specifically, an angle (electrical angle) made by the side of the circumferential section of the permanent magnet 8 in the stator side, i.e., a width of its outer peripheral surface with an axis (rotational axis of the electric rotating machine) is set as θ. When this angle θ (electrical angle) is changed, a change occurs in torque pulsation, cogging torque or an induced voltage waveform in the electric rotating machine (especially an electric motor). Particularly, in the a buried magnet type electric rotating machine of the invention, since magnetic fluxes concentrate in the auxiliary pole (auxiliary salient pole) 61, a different in crude density among the magnetic fluxes becomes larger. Thus, such a characteristic change is extremely large compared with that in an electric motor comprising a surface magnet type rotor made known by the above-described JP-A-8-995388.

Figure 2:
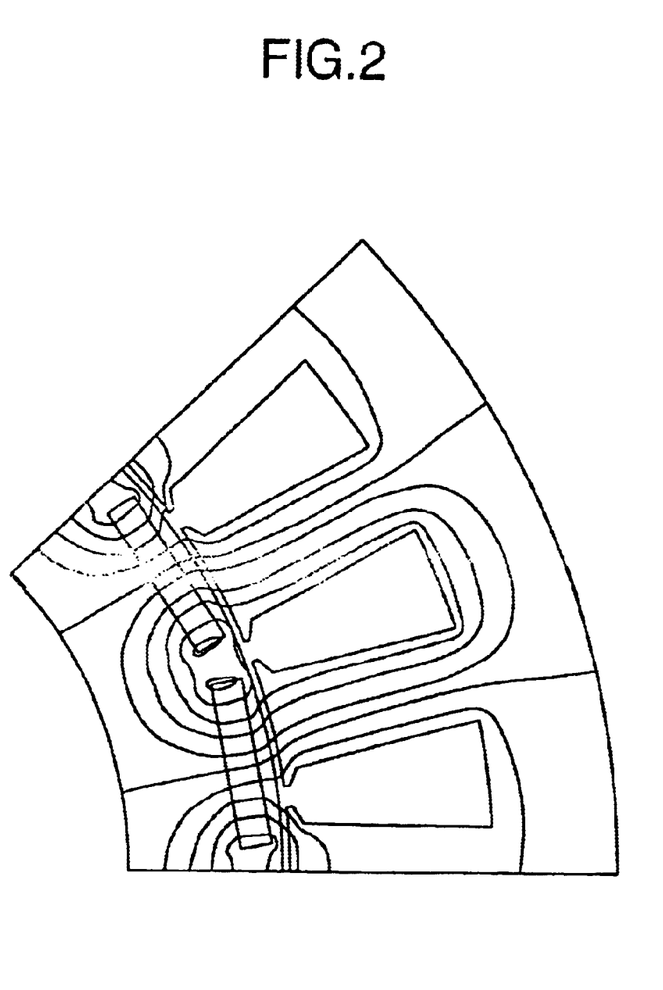
FIG. 2 is a view showing a result of magnetic field analysis when an angle θ (electrical angle) made by a width of a stator in an outer peripheral surface of a permanent magnet with an axis is 136° in the one pole pair structure of the permanent magnet type electric rotating machine shown in FIG. 1.
Figure 3:
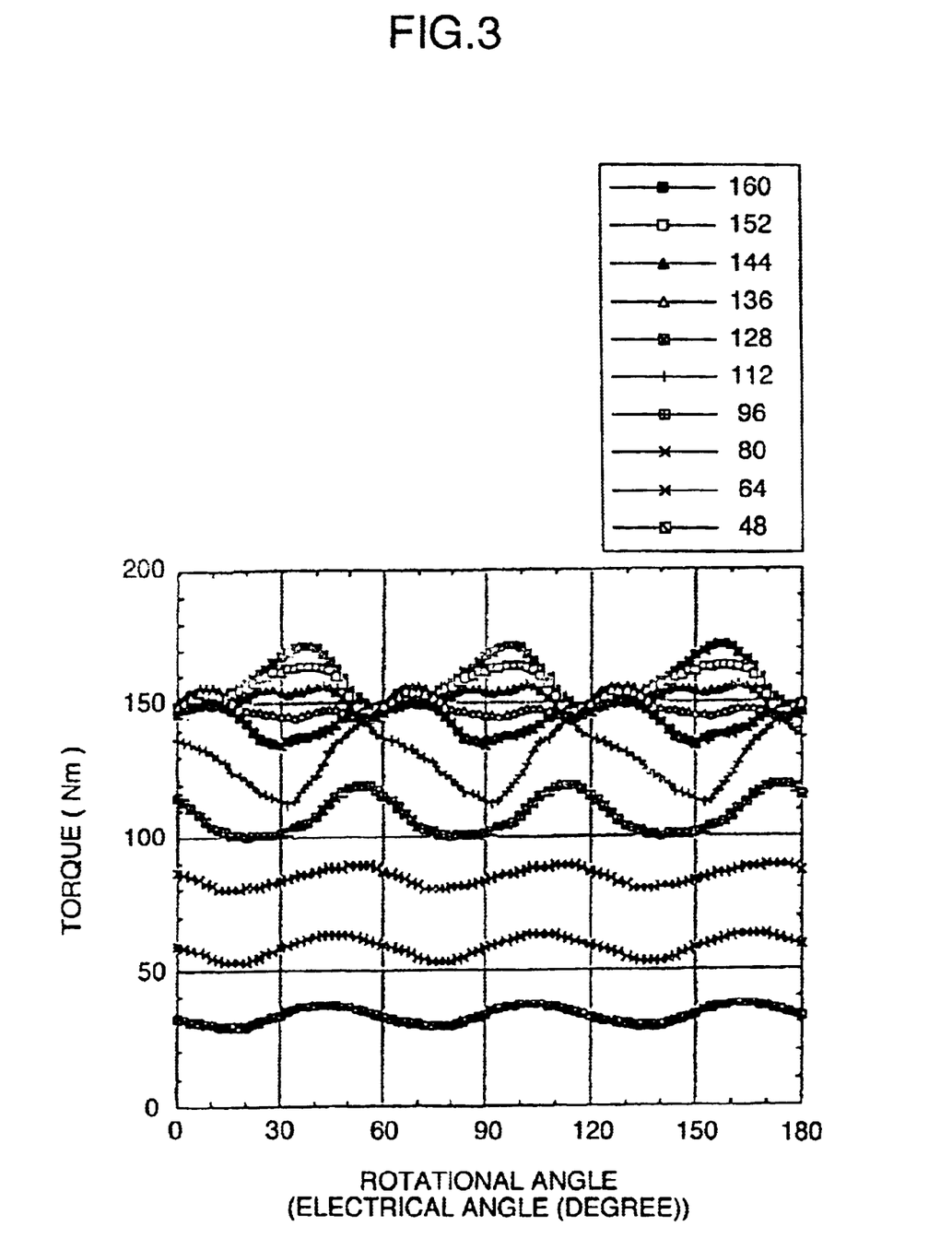
FIG. 3 is a view showing a result of measuring torque pulsation for the electric rotating machine when the angle θ of FIG. 1 is changed.
Figure 4:
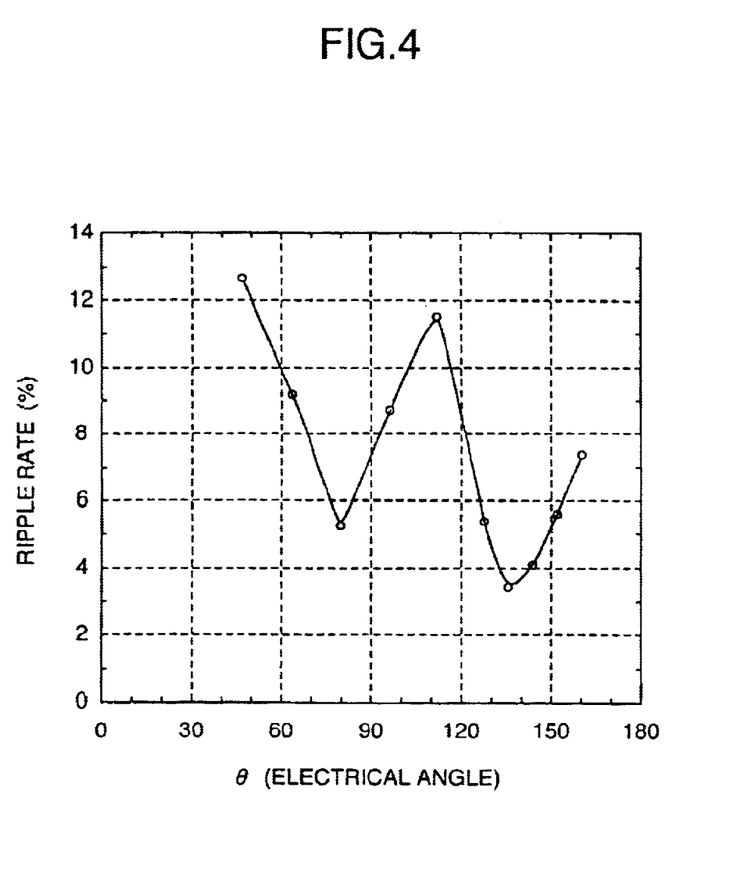
FIG. 4 is a view showing a result of measuring a ripple rate for the electric rotating machine when the angle θ of FIG. 1 is changed.

FIG. 2 shows a result of magnetic field analysis when the angle θ is set equal to 136° (electrical angle) (θ=136° (electrical angle)) in the permanent magnet type electric rotating machine of the salient-pole concentrated winding system, which is constructed in the foregoing manner, and has an output of 20 kW. FIG. 3 shows torque pulsation when the angle θ is changed to various values including 136° (i.e., changed to 40°, 64°, 80°, 96°, 112°, 128°, 136°, 144°, 152°, and 160° by using this angle θ as a parameter), and electricity is conducted to the electric rotating machine. FIG. 4 shows a ripple rate at such a time. In FIG. 3, an abscissa indicates a rotational angle (electrical angle), and a plurality of curves in the graph indicate a plurality of torque pulsations when the angle θ is set at various values other than 136°. The ripple rate is defined by ripple rate (%)= one-side amplitude of pulsation/average torque.

As can be understood from FIG. 3, when the angle θ is changed, together with the size of generated torque, its pulsation is also changed (i.e., as the angle θ is larger, generated torque is larger, and its pulsation is also changed).

In addition, as can be understood from FIG. 4, the ripple rate indicating the degree of such pulsation is changed at a given cycle, and a minimum value is set when the angle θ is 80° and 136°, i.e., at an interval of about 60°.

As apparent from the above-described JP-A-11-299199, the present inventors and others have discovered that in the electric rotating machine of a so-called distributed winding stator having 3n (n is 1, 2, 3, and so on) slots per pole (specifically, the electric rotating machine of three-phase 8 poles/48 slots (1:6)), an angle θ (mechanical angle) made by a circumferential width in the outer surface of the stator side with the axis of the rotor has an optimal point at an interval of τs (slot pitch).

On the other hand, in the electric rotating machine of the invention having a structure different from that of the foregoing electric rotating machine of the distributed winding stator, i.e., in the electric rotating machine of the salient-pole concentrated winding system where the ratio between the number of poles for the rotor and the number of slots for the stator is 2:3, its τs (slot pitch) interval is 120° (electrical angle). Accordingly, then present inventors and others have discovered that an optimal point of the angle θ (electrical angle) is reached not at the above τs interval but at an interval of τs/2. Based on this discovery, a condition for an angle θ (electrical angle) used to reduce torque pulsation is defined as in the following expression (1):

$$\theta \approx n \times \tau s/2 + 16 \text{ } (n \text{ is 1 or 2}) \tag{1}$$

It can be understood from the expression (1) that by setting the angle θ to be an electrical angle of nearly 76° or 136°, torque pulsation can be reduced in the electric rotating machine of the salient-pole concentrated winding system where the ratio between the number of poles for the rotor and the number of slots for the stator is 2:3. The values of the angle θ, 76° (electrical angle) and 136° (electrical angle), respectively correspond to mechanical angles of 9.5° and 17°. A difference (i.e., 4° (electrical angle)) between the angle θ=76° (electrical angle) obtained by the expression (1) and the angle θ=80° (electrical angle) obtained from the measuring analysis of FIG. 4 also corresponds to a mechanical angle of about 0.5°. Such a difference can be ignored, and near coincidence is realized (θ=76°≈80°).

Regarding the shifting of the angle θ by 16° (electrical angle) from n×τs/2, especially in the buried permanent magnet type electric rotating machine of the invention, a reason may be attributed to the fact that there is present a rotational gap of about 0.3 mm to 1.0 mm, the fact that there is present an iron portion having a thickness of 1 mm to 2 mm because of the formation of an insertion hole for magnet burial near the outer periphery of the rotor, or the like.

Figure 5:
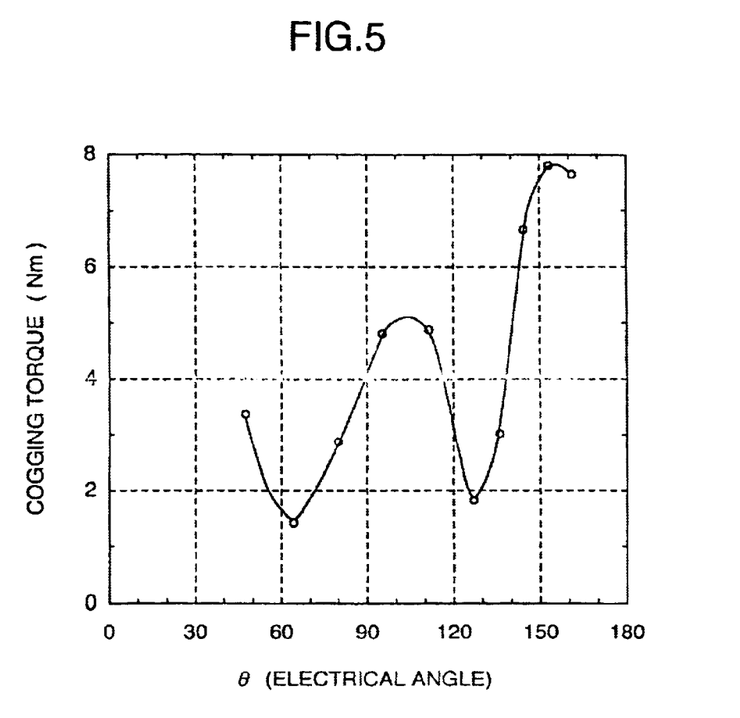
FIG. 5 is a view showing a result of measuring cogging torque from peak to peak for the electric rotating machine when the angle θ of FIG. 1 is changed.

FIG. 5 shows a change made in cogging torque (value from peak to peak) when the angle θ (electrical angle) is changed in an electrical rotating machine similar to that described above. As apparent from FIG. 5, with the change of the angle θ, cogging torque is also changed greatly. The angle θ for smaller cogging torque (minimum value) is 64° and 128°, which is also a cycle of 60°. Thus, a condition for the angle θ used to reduce cogging torque is defined by the following expression (2):

$$\theta \approx n \times \tau s/2 + 8 \text{ } (n \text{ is 1 or 2}) \tag{2}$$

It can be understood that by setting the angle θ to be an electrical angle of 68° or 128° and to be a mechanical angle of 8.5° or 16°, especially in the electric rotating machine of the salient-pole concentrated winding system where the ratio between the number of poles for the rotor and the number of slots for the stator is 2:3, its cogging torque can be reduced.

Figure 6:
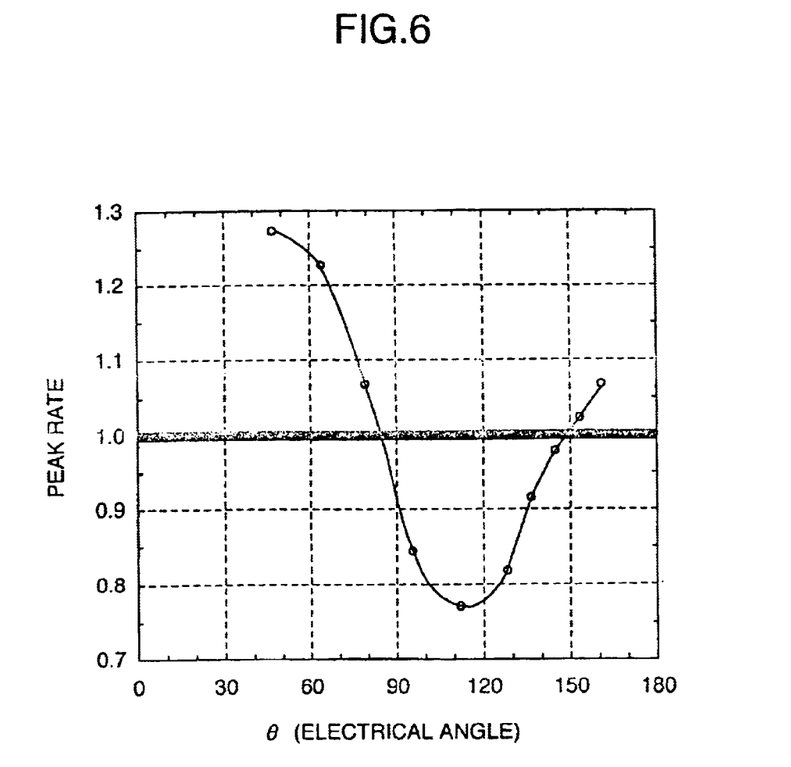
FIG. 6 is a view showing a result of measuring a waveform peak rate of a no-load induced voltage of the electric rotating machine when the angle θ of FIG. 1 is changed.

Now, description will be made of a change made in the waveform of a no-load induced voltage when the angle θ (electrical angle) is changed in an electric rotating machine similar to that described above. In this case, since a value at an electrical angle of 90° is √2 times of an effective value at en electrical value of 90° if the waveform of an induced voltage is a sine wave, a peak rate of the waveform is defined by a voltage/(effective value×√2) with peak rate=electrical angle 90°. In other words, regarding the waveform of a no-load induced voltage, with peak rate=1 as a mean value, the induced voltage has a convex waveform if peak rate>1 is set, a concave waveform if peak rate<1 is set, and a sine wave if peak rate=1. FIG. 6 shows a change made in such a peak rate when the angle θ is changed. It can be understood from FIG. 6 that the waveform of a no-load induced voltage becomes a sine wave when the angle θ is 84° or 144°, i.e., at an interval of 60°.

Thus, in the electric rotating machine of the salient-pole concentrated winding system where the ratio between the number of poles for the rotor and the number of slots for the stator is 2:3, a condition for the angle θ used to set the waveform of the no-load induced voltage as a sine wave can be defined by the following expression (3):

$$\theta \approx n \times \tau s/2 + 24 \text{ } (n \text{ is 1 or 2}) \tag{3}$$

The electrical angles of 84° and 144° respectively correspond to mechanical angles of 10.5° and 18°.

As can be understood from the foregoing examination, i.e., based on the expressions (1), (2) and (3), in particular, to improve various performances of the electrical rotating machine of the salient-pole concentrated winding system of the invention where the ratio between the number of poles for the rotor and the number of slots for the stator is 2:3, the angle θ, i.e., an angle (electrical angle) made by the outer circumferential width of the permanent magnet in the stator with the axis (rotational axis of the electric rotating machine), should be set at an angle θ defined by the following expression (4):

$$\theta = n \times \tau s/2 + 8m \quad (n: 1 \text{ or } 2, m: 1, 2 \text{ or } 3) \tag{4}$$

Depending on the m values (m: 1, 2 or 3), a difference may occur in kind among the improvements made on various performances of the electric rotating machine of the salient-pole concentrated winding system by setting the angle made by the outer circumferential width of the permanent magnet with the axis (rotational axis of the electric rotating machine) at the angle θ defined by the expression (4). To be specific, torque pulsation can be reduced by setting m=2, cogging torque can be reduced by setting m=1, and the waveform of a no-load induced voltage can be a sine wave by setting m=3.

In addition, a value of "n" in the angle θ defined by the expression (4) is properly selected to adjust torque obtained from the electric motor, especially when torque pulsation is reduced in the rotating electric machine. To be specific, as apparent from the graph shown in FIG. 3, a size of torque obtained when a value of n is set equal to "1" (i.e., θ=76° (electrical angle)) is smaller than that of torque obtained when a value of n is set equal to "2" (i.e., θ=136° (electrical angle)). In other words, n=1 is sufficient with a relatively low torque output, and advantageous especially for further reducing torque pulsation, while n=2 is advantageous when torque pulsation is reduced and large torque is necessary.

Needless to say, the above angle has a certain range for the manufacturing accuracy of the electric rotating machine. In particular, in the electric rotating machine of the salient-pole concentrated winding system used for the hybrid electric vehicle, rotors may be mass-produced by punching silicon steel plates to reduce manufacturing costs. However, considering manufacturing accuracy of punching holes and permanent magnets to be inserted, a range may be ±1° of a mechanical angle (4 to 5° of electrical angle).

Figure 7:
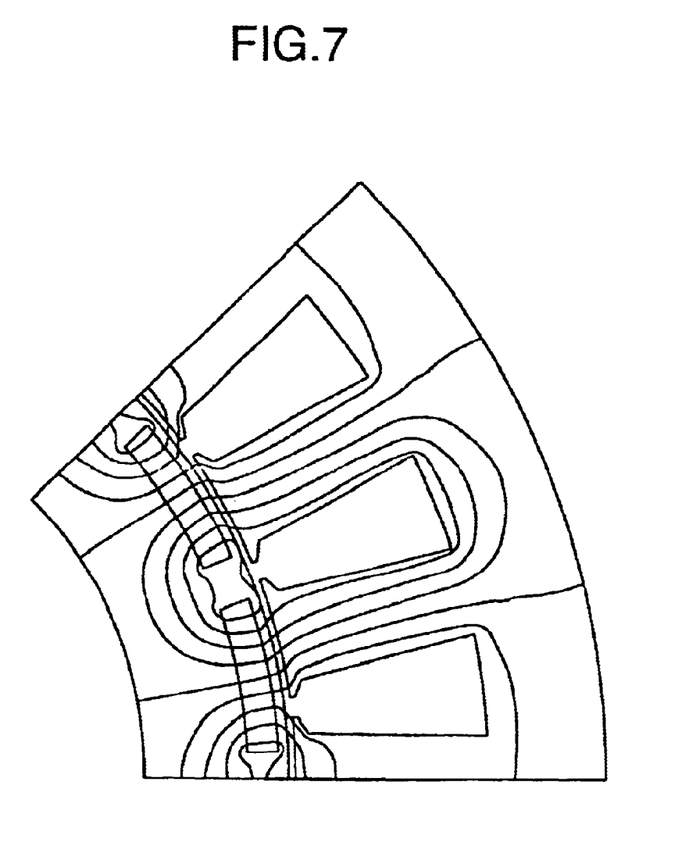
FIG. 7 is a view showing a result of magnetic field analysis in a permanent magnet type electric rotating machine comprising a permanent magnet formed in an arc shape according to a second embodiment of the invention.

The foregoing example was described on the assumption that the permanent magnet 8 of the rotor in the electric rotating machine of the salient-pole concentrated winding system having the ratio between the number of poles for the rotor and the number of slots for the stator set at 2:3 had a flat plate shape (rectangular in section). However, according to the invention, in order to better understand the effect of the shape of the permanent magnet 8 of the rotor on the angle θ, examination similar to the foregoing was made for the electric rotating machine having a permanent magnet 8 arc-shaped in section instead of the permanent magnet 8 flat-plate shaped. FIG. 7 shows a result of magnetic field analysis carried out in the examination. A magnetic field by the angle θ was substantially identical even in the arc-shaped permanent magnet of FIG. 7. As a result, it was verified that an almost similar effect can be obtained.

Figure 8:
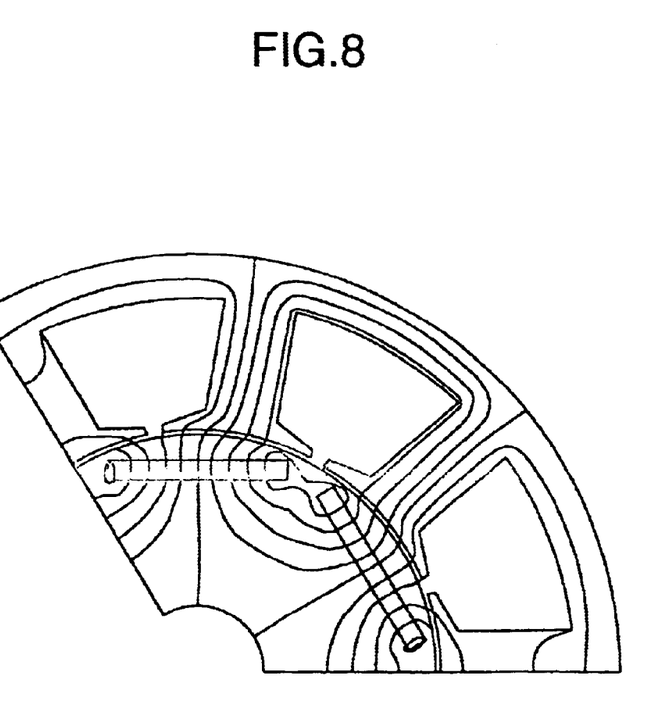
FIG. 8 is a view showing a result of magnetic field analysis, especially when the permanent magnet type electric rotating machine structure of the invention is applied to an electric rotating machine having poles amounting to 6 in number.

Furthermore, to verify general applicability when the number of poles and outputs were different in the expression (4) (but the electric rotating machine of the salient-pole concentrated winding system where the ratio between the number of poles for the rotor and the number of slots for the stator was set at 2:3), examination similar to the foregoing was made for the electric rotating machine having an output of 10 kW, a rotor different from the above rotor in radius and thickness, the number of its poles set at 6, and the number of slots for a stator set at 9 (in this case, the number of poles is naturally 6). FIG. 8 shows a result of magnetic field analysis thereof. As apparent from FIG. 8, in this electric rotating machine having 6 poles, it can be verified that the situation of a magnetic field at the angle θ (=136°) is identical to the above.

Thus, the present invention can also be applied to an electric rotating machine equipped with rotors having various shapes such as an arc shape, irrespective of the rectangular sectional shape (plate shape) of the permanent magnet 8, as long as the electric rotating machine is based on a salient-pole concentrated winding system, and has a ratio between the number of poles for the rotor and the number of slots for the stator set at 2:3. In such a case, the permanent magnet 8 may be made of one other than neodymium. As apparent to those skilled in the art, an effect almost similar to the above can be obtained even if the number of these permanent magnets 8 (the number of poles) is other than 6 or 16. In addition, also apparent to those skilled in the art, the electric rotating machine to which the invention is applicable, especially one requiring a reduction in torque pulsation or cogging torque, or the waveform of an induced voltage to be a sine wave, can be applied to a linear motor, and so on, irrespective of an inward or outward swing type electric rotating machine.

Figure 9:
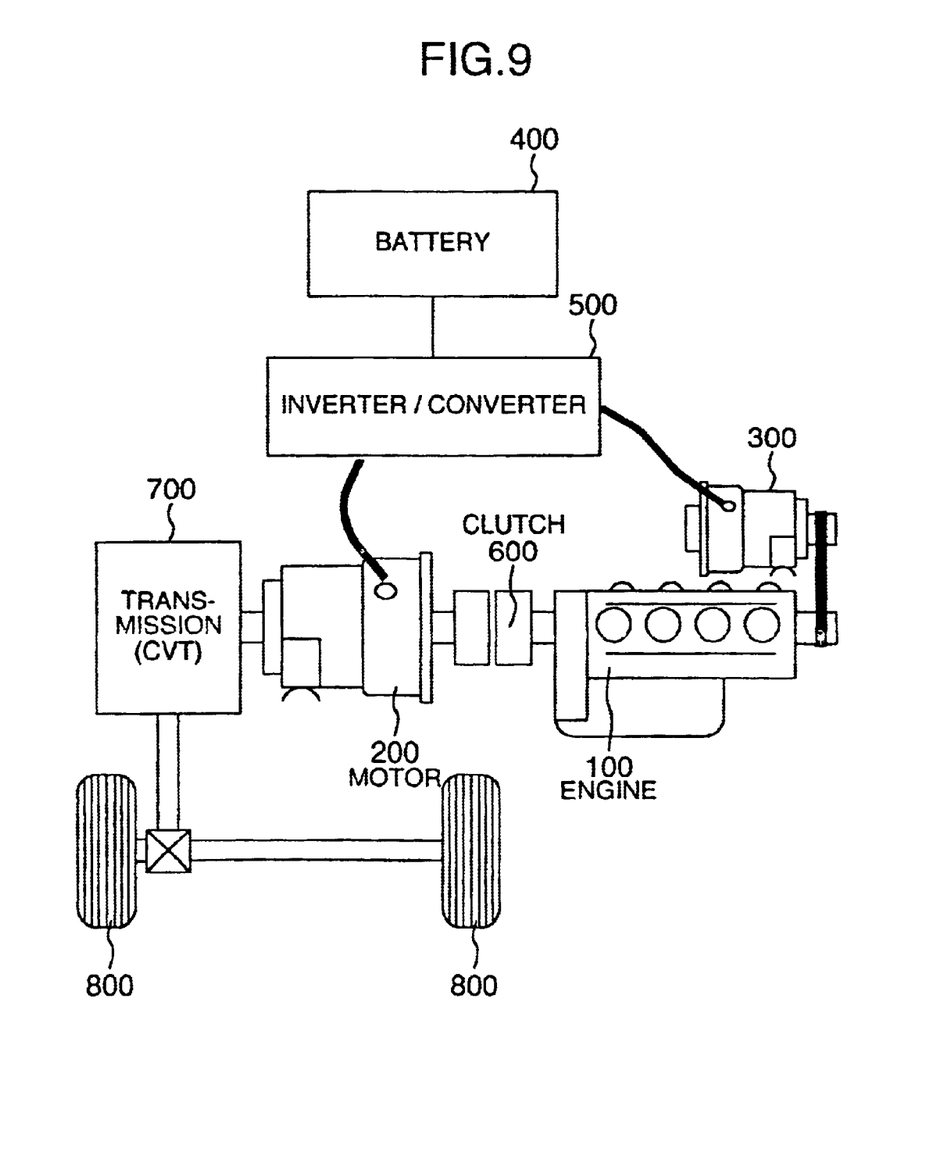
FIG. 9 is a view showing an example of a configuration where the permanent magnet type electric rotating machine of the invention is applied to a hybrid electric vehicle.

However, as described above, the permanent magnet type electric rotating machine of the invention is particularly advantageous when it is used as a driving motor for the hybrid electric vehicle having a structure where the general gasoline engine and the electric motor are directly connected to one and the same drive shaft. FIG. 9 shows an exemplary configuration where the electric rotating machine of the salient-pole concentrated winding system of the invention is mounted as a driving motor in the hybrid electric vehicle.

A driving system in the hybrid electric vehicle shown in FIG. 9 mainly includes an engine 100 driven by fuel such as gasoline, a driving motor 200 of the invention, a generator 300, a battery 400, and a so-called inverter/converter 500 for performing power conversion among the driving motor, the generator 300 and the battery. The driving motor 200 is directly connected between the output shaft of the engine 100 and a transmission gear (e.g., continuously variable transmission, CVT), i.e., one and the same drive shaft. In the drawing, a reference numeral 700 denotes a wheel of an automobile driven by the driving system.

The operations of the driving system at respective traveling modes in the hybrid electric vehicle are as follows.

(1) During stop: The engine is stopped, a clutch is OFF, and the motor is in an idle state (but if battery power is short, the generator is rotated by driving the engine to charge the battery).

(2) During low-speed traveling: The engine is stopped, the clutch is OFF, and the motor is driven (but if battery power is short, the generator is rotated by driving the engine to charge the battery).

(3) During mid-speed traveling: The engine is driven, the clutch is ON, and the motor is associatively rotated (not output).

(4) During high-speed traveling: The engine is driven, the clutch is ON, and the motor is driven.

(5) During reduction: The engine is inertially rotated, the clutch is ON, and the motor is regenerative (may be regenerated by the generator).

(6) During reverse traveling: The engine is stopped, the clutch is OFF, and the motor is driven (but if battery power is small, the generator is rotated by driving the engine to charge the battery).

The hybrid electric vehicle is driven only by the motor 200 employing the electric rotating machine of the salient-pole concentrated winding system of the invention during stop or low-speed traveling. In this case, vibration or noise is generated by pulsation when the torque pulsation of the motor 200 is large, by cogging torque when the cogging torque is large, or by the quantity of shifting from an energized sine-wave current when a no-load induced voltage is not a sine wave.

In the conventional art, as described above, in order to reduce cogging torque by skewing or to reduce the torque pulsation or the cogging torque of the motor output, means is provided for controlling the output torque of the motor in such a way as to cancel the torque pulsation or the cogging torque. For example, a vibration reduction controller is added. However, any of these measures is not preferable, because it causes an increase in manufacturing costs.

On the other hand, according to the structure of the electric rotating machine of the salient-pole concentrated winding system of the invention, without any cost increases of the electric motor brought about by skewing like the foregoing, or any cost increases brought about by providing the vibration reduction controller, the generation of output torque pulsation or cogging torque in the motor 200 as a driving source for the hybrid electric vehicle, or the generation of vibration or noise caused by the distortion of a no-load induced voltage, can be selectively reduced at the designing state of the electric rotating machine as occasion demands. Thus, it is possible to provide a comfortable hybrid electric vehicle having little vibration or noise during stop or low-speed traveling.

Furthermore, regarding the mounting position of the motor in the hybrid electric vehicle shown in FIG. 9, a space obtained by hybridizing a forward/backward switching gear, a torque controller, and so on, in the conventional gasoline engine driven vehicle (especially the forward/backward switching gear is made unnecessary) may be used to house the motor therein. The use of such a space is particularly preferable in that the layout of a engine room in the conventional gasoline engine driven vehicle is not changed greatly. In other words, by enabling the motor 200 to be mounted in such a position, the motor can be assembled in a part of the conventional driving system without any need to construct a new driving system in the hybrid electric vehicle. As a result, vehicle development costs for hybridization can be greatly reduced.

However, to enable the motor 200 to be mounted in such a space, especially when the current structure of the forward/backward switching gear is considered, its axial length must be shortened. As an electric rotating machine capable of shortening the axial direction, the foregoing electric rotating machine of the salient-pole concentrated winding system is suitable, and particularly one provided by the invention is most suitable. By applying the electric rotating machine of the salient-pole concentrated winding system of the invention, low costs can be realized simultaneously.

Thus, according to the permanent magnet type electric rotating machine of the invention, by setting the circumferential length of the permanent magnet in the surface of the stator side, it is possible to reduce torque pulsation or cogging torque, alternatively to set a no-load induced voltage wave form as a sine wave without any skewing in the molding magnet. In addition, a more comfortable hybrid electric vehicle can be provided by setting the circumferential length of the permanent magnet in the surface of the stator side in such a way as to reduce vibration during the stop or low-speed traveling of the vehicle.

As apparent from the foregoing detailed description, according to the permanent magnet type electric rotating machine of the invention, it is possible to selectively reduce vibration or noise caused by torque pulsation, cogging torque or the distortion of a no-load induced voltage waveform. The permanent magnet type electric rotating machine provided is particularly suitable for the hybrid electric vehicle structured to have the engine and the electric motor directly connected to one and the same drive shaft. Moreover, the mounting of the electric rotating machine of the invention in the hybrid electric vehicle provides its comfortable riding.

What is claimed is:

1. A permanent magnet type electric rotating machine comprising:
    a stator which includes a stator iron core having a plurality of slots and a three-phase stator winding wound concentrically around salient-poles of said stator iron core, which salient poles are formed between said plurality of slots; and
    a rotor provided at said stator, with a rotational gap so as to be rotatable, said rotor including a rotor iron core within which a plurality of magnet housing portions are formed in a circumferential direction thereof and permanent magnets housed within said plurality of magnet housing portions, such that magnetic poles of said permanent magnets differ alternately; wherein
    a ratio between a number of magnetic poles of said rotor and a number of said slots of said stator is 2:3; and
    when a slot pitch of said stator is formed at an electrical angle $\tau s$, an electrical angle $\theta$ formed by a circumferential extent of said permanent magnet in a surface of the stator about an axis of said rotor is set at $\theta \approx n \times \tau s / 2 + 8 \times m$ (n=1 or 2, and m=1, 2 or 3).

2. A hybrid vehicle having a driving system with an engine and an electric motor directly coupled through a clutch between a driving shaft of said engine and a transmission gear, wherein said electric motor comprises a permanent magnet type electric rotating machine according to claim 1.

3. A permanent magnet type electric rotating machine comprising:
    a stator which includes a stator iron core having a plurality of slots and a three-phase stator winding wound concentrically around salient-poles of said stator iron core, which salient poles are formed between said plurality of slots; and
    a rotor provided at said stator, with a rotational gap so as to be rotatable, said rotor including a rotor iron core within which a plurality of magnet housing portions are formed in a circumferential direction thereof and permanent magnets housed within said plurality of magnet housing portions, such that magnetic poles of said permanent magnets differ alternately; wherein
    a ratio between a number of magnetic poles of said rotor and a number of said slots of said stator is 2:3;
    said rotational gap is in a range of 0.3 mm to 1.0 mm;
    a thickness of the rotor iron core portion existing on said stator side of each of said permanent magnet is in a range of 1 mm to 2 mm; and
    when a slot pitch of said stator is formed at an electrical angle of 120 degrees, an electrical angle formed by a circumferential extent of said permanent magnet in a surface of the stator about an axis of said rotor is set approximately at one of 64 degrees, 76 degrees, 84 degrees, 128 degrees, 136 degrees and 144 degrees.

4. The permanent magnet type electric rotating machine according claim 3, wherein the number of said slots of said stator is 12 and the number of magnetic poles of said rotor is 8.

5. The permanent magnet type electric rotating machine according to claim 3, wherein the number of said slots of said stator is 18 and the number of magnetic poles of said rotor is 12.

6. The permanent magnet type electric rotating machine according to claim 3, wherein the number of said slots of said stator is 124 and the number of magnetic poles of said rotor is 16.

7. A hybrid vehicle having a driving system with an engine and an electric motor directly coupled through a clutch between a driving shaft of said engine and a transmission gear, wherein said electric motor comprises a permanent magnet type electric rotating machine according to claim 3.

8. A permanent magnet type electric motor coupled to drive a hybrid electric vehicle which is also driven by an engine, comprising:
   a stator which includes a stator iron core having a plurality of slots and a three-phase stator winding wound concentrically around salient-poles of said stator iron core, which salient poles are formed between said plurality of slots; and
   a rotor provided at said stator, with a rotational gap so as to be rotatable, said rotor including a rotor iron core within which a plurality of magnet housing portions are formed in a circumferential direction thereof and permanent magnets housed within said plurality of magnet housing portions, such that magnetic poles of said permanent magnets differ alternatively; wherein
   a ratio between a number of magnetic poles of said rotor and a number of said slots of said stator is 2:3;
   said rotational gap is in a range of 0.3 mm to 1.0 mm, a thickness of the rotor iron core portion existing on said stator side of each of said permanent magnet is in a range of 1 mm to 2 mm; and
   when a slot pitch of said stator is formed at an electrical angle of 120 degrees, an electrical angle formed by a circumferential extent of said permanent magnet in a surface of the stator about an axis of said rotor is set at 136 degrees.

9. The permanent magnet type electric motor according to claim 8, wherein the number of said slots of said stator is 12 and the number of magnetic poles of said rotor is 8.

10. The permanent magnet type electric motor according to claim 8, wherein the number of said slots of said stator is 18 and the number of magnetic poles of said rotor is 12.

11. The permanent magnet type electric motor according to claim 8, wherein the number of said slots of said stator is 124 and the number of magnetic poles of said rotor is 16.

12. A hybrid vehicle having a driving system with an engine and an electric motor directly coupled through a clutch between a driving shaft of said engine and a transmission gear, wherein said electric motor comprises a permanent magnet type electric rotating machine according to claim 8.

* * * * *